US008116970B2

(12) United States Patent
Hoofd et al.

(10) Patent No.: US 8,116,970 B2
(45) Date of Patent: Feb. 14, 2012

(54) METHOD AND DEVICE FOR CALCULATING A PATH WHICH IS LATERALLY OFFSET WITH RESPECT TO A REFERENCE PATH

(75) Inventors: Francois Hoofd, Toulouse (FR); Christophe Caillaud, Blagnac (FR)

(73) Assignee: Thales (FR)

( * ) Notice: Subject to any disclaimer, the term of this patent is extended or adjusted under 35 U.S.C. 154(b) by 1086 days.

(21) Appl. No.: 11/963,743

(22) Filed: Dec. 21, 2007

(65) Prior Publication Data

US 2008/0154490 A1 Jun. 26, 2008

(30) Foreign Application Priority Data

Dec. 22, 2006 (FR) ...................................... 06 11270

(51) Int. Cl.
*G01C 21/00* (2006.01)

(52) U.S. Cl. ........................................ 701/122; 701/206

(58) Field of Classification Search ......................... None
See application file for complete search history.

(56) References Cited

U.S. PATENT DOCUMENTS 6,405,124 B1 6/2002 Hutton
7,024,287 B2 * 4/2006 Peckham et al. .................. 701/3
7,483,790 B2 * 1/2009 Brent et al. ................... 701/301
7,487,039 B2 * 2/2009 Rumbo et al. ................ 701/202
7,698,026 B2 * 4/2010 Dey et al. .......................... 701/3

* cited by examiner

*Primary Examiner* — Michael J. Zanelli

(74) *Attorney, Agent, or Firm* — Lowe Hauptman Ham & Berner, LLP

(57) ABSTRACT

The invention relates to a method of calculating a path which is offset laterally by a first distance with respect to a reference path, comprising the calculation of a flight plan which is offset with respect to a reference flight plan. The reference flight plan is defined on the basis of waypoints and of segments defining a reference path between the waypoints. Each segment has a start point and an end point making it possible to define a course corresponding to the direction of travel by an aircraft. The laterally offset flight plan is calculated on the basis of waypoints associated with the waypoints of the reference flight plan, called associated points and being situated at the intersection. The laterally offset flight path includes lines, parallel with the segments of the reference flight plan, offset by the first distance from the reference flight plan. It is further defined by the bisectrix of the angle formed by two adjacent segments at a waypoint belonging to the reference path. The method includes detection of the segments of the offset flight plan, whose direction of travel is reversed with respect to that of the corresponding segment belonging to the reference flight plan. The elementary paths are calculated, making it possible to connect the segments of the offset flight plan whose direction of travel is not reversed.

7 Claims, 3 Drawing Sheets

METHOD AND DEVICE FOR CALCULATING A PATH WHICH IS LATERALLY OFFSET WITH RESPECT TO A REFERENCE PATH

RELATED APPLICATIONS

The present application is based on, and claims priority from, French Application Number 06 11270, filed Dec. 22, 2006, the disclosure of which is hereby incorporated by reference herein in its entirety.

TECHNICAL FIELD

The invention relates to a method of calculating a path which is laterally offset with respect to a reference path, the said reference path being defined on the basis of waypoints and segments connecting the said waypoints. This path is displayed to the operator and can be used for guiding the aircraft.

A laterally offset path is a path parallel to a reference path, spaced by a certain separation. This separation is called an offset in English terminology. This concept is defined in the standard RTCA DO236B. The function of an offset is to guarantee the maintaining of a parallel route within SLO (Strategic Lateral Offset) limits for operations in RVSM (Reduced Vertical Separation Minimum) zones. In fact, the reduction of the vertical minimums and the improvement of the positioning accuracy of the aircraft significantly increase the probabilities of encountering slipstream turbulence coming from an aircraft situated above.

The use of a systematic offset of the order of one nautical mile to the right of the reference route furthermore makes it possible to reduce the risks of collision in the case of abnormal events. These recommendations are applicable in oceanic zones without radar cover and usually practised in continents with low air control density, such as Africa. Another conventional application of offset is avoidance of traffic or of meteorological problems.

A flight plan is constituted of waypoints and of segments connecting the said waypoints. A path is calculated on the basis of the flight plan and of instructions to follow the flight plan.

According to the standard RTCA DO236B, an offset point of the path, called the associated point, is positioned at the intersection, on the one hand, of lines parallel with the segments of the reference flight plan, offset by the desired offset distance, and, on the other hand, of the bisectrix of the angle formed by two segments adjacent to the waypoint belonging to the reference path.

This calculating principle can give rise to route direction reversals when certain waypoints are close to each other, in particular when they are separated by a distance less than the offset value. This phenomenon results in problems of continuity of the data in the laterally offset path.

In the rest of the text, the points belonging to the laterally offset flight plan will be called associated points and the points belonging to the reference flight plan will be called parent points. By extension, the segments belonging to the laterally offset flight plan will be called associated segments and the segments belonging to the reference flight plan will be called parent segments.

FIG. 1 shows a path 11 offset with respect to a reference path 12. The associated points A', B', C' and D' of the offset path are obtained from the points A, B, C and D by applying the preceding calculation principle. This calculation results in an inversion of the direction of travel for the segment [B', C'] with respect to the segment [B, C]. This inversion is not operationally acceptable because the purpose of an offset is not to force an aircraft to backtrack but rather to guarantee the maintaining of a parallel route.

A first solution consists in retaining the inversions and in leaving the pilot to sort things out eventually.

A second solution consists in shortening the offset at the first point where this type of problem arises.

A third solution consists in analysing, a posteriori, the result of the calculation and in creating a new offset waypoint. This solution however does not make it possible to guarantee a reliable calculation of the PDE (Path Definition Error: over which the DO236 standard imposes a certain control). Moreover, when several reversals are detected, this solution does not provide for a second resolution attempt.

These solutions do not give entire satisfaction because the function of calculating a path that is laterally offset with respect to a reference path can be unavailable over a potentially large part of the flight plan because of an individual problem. Moreover, these solutions give rise to a large risk of incorrect processing and poor path construction. Finally, this type of behaviour is highly prejudicial to the confidence of the crew regarding the accuracy of the path calculation.

SUMMARY OF THE INVENTION

The objective of the invention is to mitigate the previously mentioned problems by proposing a method of calculating a path which is offset laterally with respect to a reference path.

The method of calculating a path which is offset laterally with respect to a reference path according to the invention proposes depending upon the data produced by the calculation of the associated points belonging to the laterally offset path. It is based in particular on the use of the non-flyable data of the laterally offset path calculated over the segments whose direction of travel is reversed during the calculation of the offset path.

The method of calculating a path which is offset laterally with respect to a reference path according to the invention harmoniously shares the responsibilities between the two sub-systems involved in the generation of a laterally offset path. The first sub-system, the flight plan manager, positions the points and indicates the anomalies. However, the second sub-system, responsible for calculating the path, generates a flyable reference path starting from the last segment with a non-reversed direction of travel followed by a capture of the first following segment with a non-reversed direction of travel. The method according to the invention makes it possible to solve all of the cases and therefore to provide functionality over the totality of the involved part of the flight plan. It also makes it possible to ensure the construction of a path complying with the spirit of the flight plan.

For this purpose, the subject of the invention is a method of calculating a path which is offset laterally by a first distance with respect to a reference path, comprising the calculation of a flight plan which is offset with respect to a reference flight plan, the said reference flight plan being defined on the basis of waypoints and of segments defining a reference path between the said waypoints, each segment comprising a start point and an end point making it possible to define a course corresponding to the direction of travel by an aircraft, the said laterally offset flight plan being calculated on the basis of waypoints associated with the waypoints of the said reference flight plan, called associated points and being situated at the intersection, of lines, parallel with the segments of the reference flight plan, offset by the first distance from the reference flight plan and of the bisectrix of the angle formed by two adjacent segments at a waypoint belonging to the said reference path, characterized in that it comprises the following steps:

the detection of the segments of the offset flight plan, whose direction of travel is reversed with respect to that of the corresponding segment belonging to the reference flight plan, the calculation of elementary paths making it possible to connect the segments of the offset flight plan whose direction of travel is not reversed.

Advantageously, the method of calculating a path which is offset laterally with respect to a reference path according to the invention furthermore comprises a step of deleting the said segments whose direction of travel is reversed.

Advantageously, the method of calculating a path which is offset laterally with respect to a reference path according to the invention comprises the following steps for defining the whole of the laterally offset path:

the calculation of the laterally offset flight plan, defining segments associated with the segments belonging to the reference flight plan, the analysis of all of the segments of the laterally offset flight plan in such a way as to detect those [B',C'] whose direction of travel is reversed with respect to that of their corresponding segment [B,C] belonging to the reference flight plan, the replacement of the associated segments following the associated segments whose direction of travel is reversed [C',D'] by half lines 42, each of the said half straight 42 lines passing through the end point D' of the following replaced associated segment [C',D'] and being parallel with the said following replaced associated segment [C',D'], the calculation of elementary paths 41 making it possible to connect the segments whose direction of travel is not reversed.

Advantageously, the method of calculating a path which is offset laterally with respect to a reference path according to the invention furthermore comprises a step of deleting segments having a reversed direction of travel [B',C'] by carrying out for each of the said segments the collocation of its end point C' with the end point B' of the preceding segment whose direction of travel is not reversed.

Advantageously, the calculation of a path making it possible to connect the segments situated on either side of deleted segments is carried out with a pre-existing calculation rule, called the 45° interception rule.

Advantageously, the method of calculating a path which is offset laterally with respect to a reference path according to the invention comprises the following steps:

the calculation of the laterally offset flight plan, defining a series of segments associated with the segments belonging to the reference flight plan, searching, amongst the series of associated segments, for a segment i whose direction of travel is reversed and, for each segment i detected, the repetition of the following steps:

searching for a segment i+j, following the said segment i, whose direction of travel is not reversed, the analysis of the said segment i+j to determine if the elementary path to be calculated must rejoin the start point or the end point of the said segment i+j, the calculation of an elementary path making it possible to connect the segment i−1, whose direction of travel is not reversed, and the segment i+j using an algorithm adapted according to the result of the preceding analysis.

Advantageously, the method of calculating a path which is offset laterally with respect to a reference path according to the invention furthermore comprises the following step: the deletion of the segments i to i+j−1 whose directions of travel are reversed.

The invention also relates to a device for calculating a path which is offset laterally with respect to a reference path comprising flight plan management means and path calculating means, characterized in that:

the said flight plan management means comprise means of calculating the waypoints of the laterally offset flight plan and means of detection of the segments exhibiting reversals of the direction of travel with respect to their associated segments in the reference flight plan, the path calculating means comprises means of calculating a path connecting the segments whose direction of travel is not reversed.

The invention also relates to a flight management system for an aircraft, comprising flight plan management means and means of calculating a reference path for the guidance of the said aircraft, characterized in that it furthermore comprises the device for calculating a path which is offset laterally with respect to a reference path according to the invention.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

The method of calculating a path which is offset laterally with respect to a reference path according to the invention comprises two main steps. The first step consists in calculating, over the offset part, the position of the end points of the segments as well as, if necessary, the new course to follow. This is particularly the case for a capture of an offset path from the original flight plan and for a return to the original flight plan from an offset path. This step furthermore comprises the detection of segments of the offset path whose direction of travel is reversed with respect to their parent segment belonging to the reference path.

The second step consists in calculating the whole of the path over the flight plan. Over the so-called offset part of the path, the data calculated previously (position and course) is used and path calculating algorithms are applied as though it were a normal flight plan and ignoring the segments exhibiting a reversal of direction of travel. An algorithm for capturing the next segment is then used.

The first variant of the method according to the invention comprises the following steps described hereafter.

Figure 1:
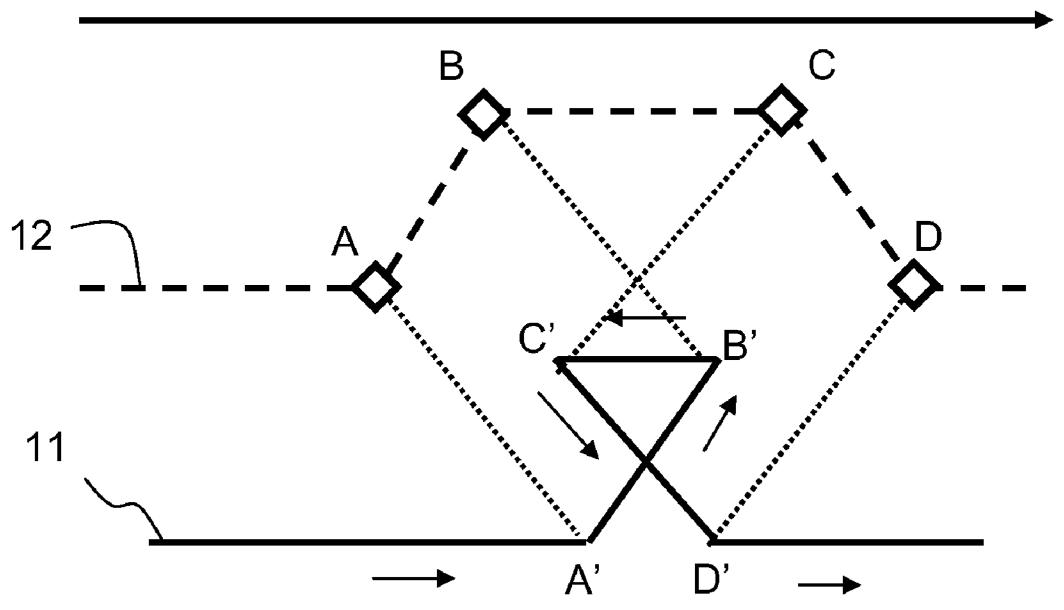
FIG. 1 shows a first example of a path which is offset laterally with respect to a reference path having a segment with a reversal of direction of travel, in a method of calculating an offset path according to the prior art.
Figure 2:
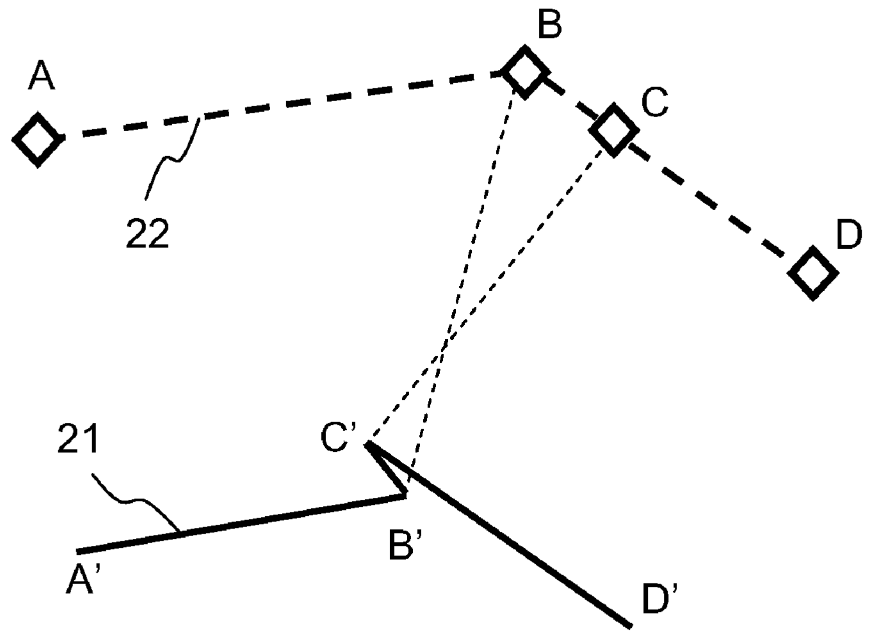
FIG. 2 shows a second example of a path which is offset laterally with respect to a reference path having a segment with a reversal of direction of travel, in a method according to the prior art.

A first step consists in analysing all of the segments of the laterally offset path in order to detect those whose direction of travel is reversed with respect to their parent segment belonging to the reference path. FIG. 2 shows a second example of a path 21 which is offset laterally with respect to a reference path 22 having a segment with a reversal of its direction of travel. In the second example, the step of detection of the segments with a reversed direction of travel makes it possible to detect that the segment [B', C'] has a reversed direction of travel with respect to the parent segment [B, C]. The segments [A', B'] and [C', D'] have a direction travel identical to that of their respective parent segment [A, B] and [C, D].

Figure 3:
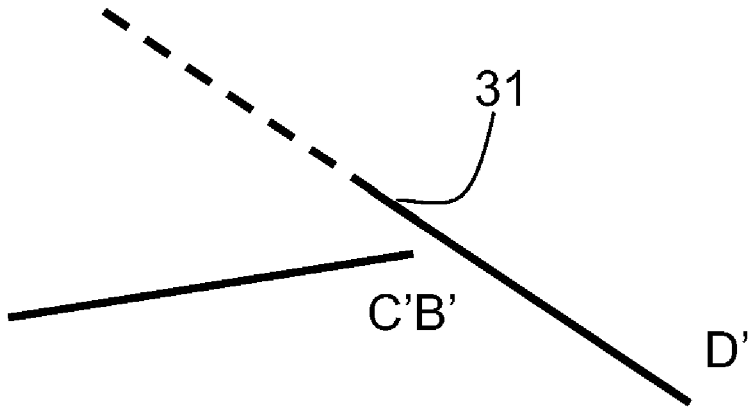
FIG. 3 illustrates a deletion of a segment having a reversal of direction of travel in the second laterally offset path example, this step being part of the method of the invention.

Advantageously, the method according to the invention comprises a second step which consists in deleting the segments with a reversed direction of travel by carrying out for each of the said segments the collocation of its end point with the end point of the preceding segment whose direction of travel is not reversed. FIG. 3 illustrates the step of deletion of the segments with a reversed direction of travel in the second example. The point C' is transferred to the same position as the point B'. The points A', B' and D' are not moved.

A third step consists in modifying the segments following the deleted segments. In the second example, the segment [C, D], parent of the segment [C', D'], is of the TF type (TF being the acronym for the English expression "Track to Fix"), which is a segment of maintaining route between a start point and an end point. The segment 31 following the point C' and leading to the point D' becomes a half line passing through D'. Such a half line is called CF (the acronym of the English expression "Course to Fix", which represents a manoeuvre of maintaining route up to a point. This half line has the same direction as the segment [C', D'], before the movement of the point C' in the preceding step. In general, each of the associated segments following an associated segment with a reversed direction of travel is replaced by a half line passing through the end point of the said segment and parallel with the said segment.

Figure 4:
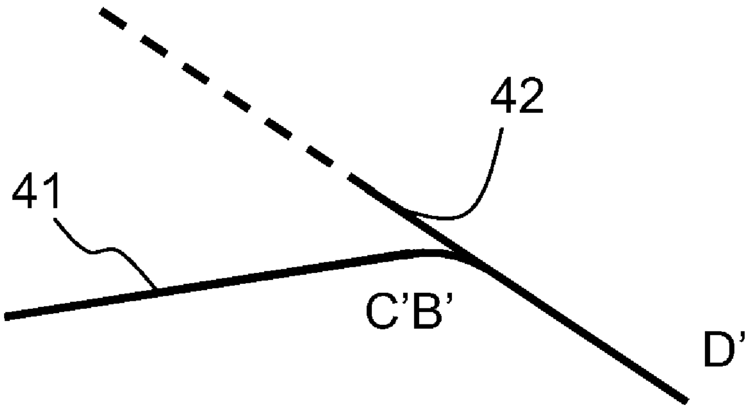
FIG. 4 illustrates a path making it possible to connect segments that are not deleted in the second laterally offset path example, calculated according to the method of the invention.

A fourth step consists in calculating elementary paths making it possible to connect the non-deleted segments. For each of the previously deleted segments (having a reversed direction of travel), a path is calculated in order to connect, on the one hand, the segment preceding the deleted segment with a reversed direction of travel and, on the other hand, the half line created starting from the segment following the deleted segment with a reversed direction of travel. This path is calculated with a pre-existing rule called the 45° interception rule the principle of which is to add a capture segment converging towards the half line at an angle of 45°. FIG. 4 shows the offset path 41 passing through the points collocated B' and C' and rejoining the half line 42 whose end point is the point D'.

Figure 5:
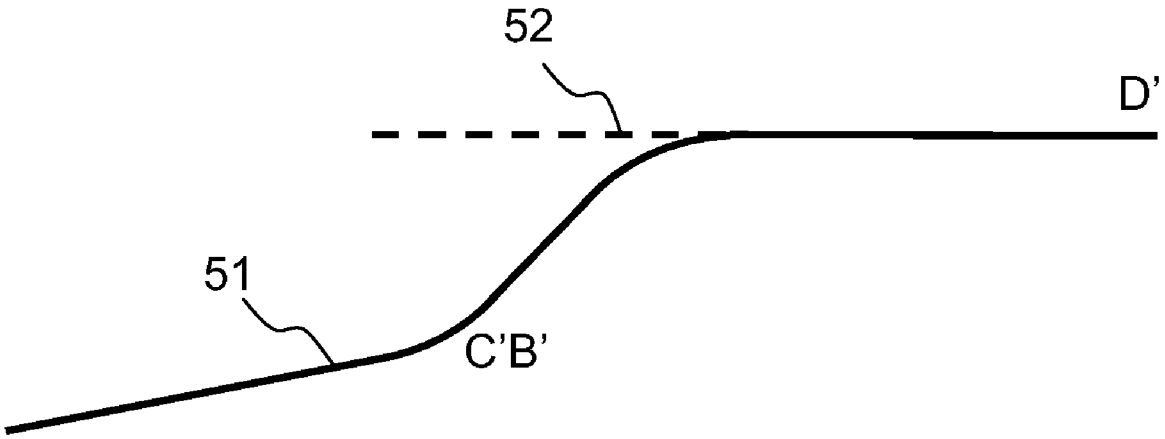
FIG. 5 illustrates a path making it possible to connect two segments, calculated according to the method of the invention.

In certain cases, the segment is not aligned with the point C', the 45° capture algorithm of the following segment is illustrated in FIG. 5. The segment leading to B' is connected to the half line leading to D' by means of a capture path following a segment converging towards the half line at an angle of 45°.

If several segments with reversed direction of travel succeed one another, all of the end points of these segments are positioned on the end point of the segment with a non-reversed direction of travel preceding them. The first segment with a non-reversed direction of travel is replaced by a half line as explained previously.

The principal advantage of the first variant of the method according to the invention is that the calculation of the capture is a basic rule for generating the path depending on algorithms developed apart from the problematics of laterally offset path calculation. These algorithms have an overall view of the transition to be constructed and their purpose is to comply with a capture of the segment following in the best conditions whilst complying with the overall intention of the flight plan. They are therefore particularly suitable.

However, the first variant of the method according to the invention adds an additional stage of analysis over all of the offset segments. Moreover, it can introduce a slight degradation of the accuracy of the definition of the reference path. The purpose of a second variant of the method according to the invention is to mitigate these problems.

The second variation of the method according to the invention consists in deleting in flight the segments of the offset flight plan whose direction of travel is reversed with respect to the parent segment in the flight plan, then in capturing at 45° from the following segment in the context of the calculation of the reference path.

A first step consists in calculating a laterally offset flight plan, defining a series of segments associated with the segments belonging to the reference flight plan.

A second step consists in searching, from among the series of associated segments, for a segment i whose direction of travel is reversed and, for each segment i detected, repeating the following steps:

- searching for a segment i+j, following the said segment i, whose direction of travel is not reversed,
- analysis of the said segment i+j in order to determine if the elementary path to be calculated must rejoin the start point or the end point of the said segment i+j. The criterion used is that of the best accuracy,
- the calculation of an elementary path making it possible to connect the segment i−1 whose direction of travel is not reversed, and the segment i+j using an algorithm adapted according to the result of the preceding analysis.

Figure 6:
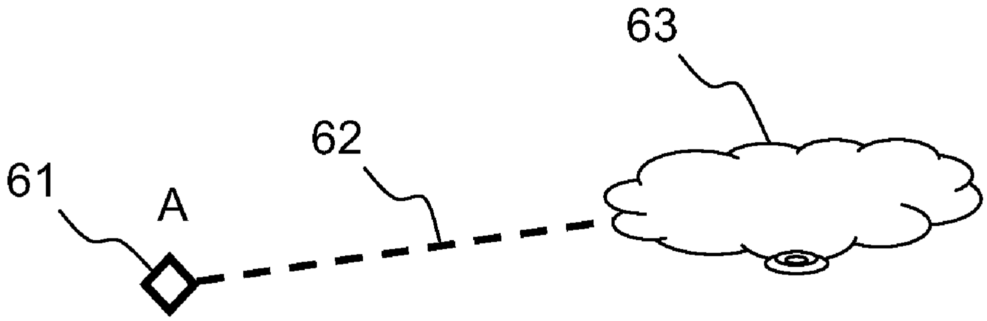
FIG. 6 shows an example of an FX segment (FX being the abbreviation of the English expression "Course From Fix").

In order to connect the start point of the segment i+j, a segment capture algorithm called FX (FX being the abbreviation of the English expression "Course from Fix"), an example of which is given in FIG. 6, is used. A segment of the FX type is characterized by an anchor point 61. The segment 62 is defined by the course moving away from the anchor point 61. The end 63 of this segment can be an altitude condition or indeterminate. These algorithms are comparable with those described in the first method for half line capture. A half line capture algorithm is used in order to connect the end point of the following segment.

In general, it will be the interpolation of the start course of the segment which will be the most accurate.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of calculating a path which is offset laterally by a first distance with respect to a reference path, comprising the steps of:

calculating a flight plan which is laterally offset with respect to a reference flight plan, the reference flight plan being defined on the basis of waypoints and of segments defining a reference path between the waypoints, each segment comprising a start point and an end point making it possible to define a course corresponding to a direction of travel by an aircraft, the laterally offset flight plan being calculated on the basis of waypoints associated with the waypoints of the said reference flight plan, and being situated at intersections:

of lines, parallel with the segments of the reference flight plan, offset by the first distance from the reference flight plan; and of a bisectrix of an angle formed by two adjacent segments at a waypoint belonging to the reference path;

detecting segments of the offset flight plan, whose direction of travel is reversed with respect to that of the corresponding segment belonging to the reference flight plan; and calculating elementary paths making it possible to connect the second segments of the offset flight plan a direction of travel of which is not reversed.

2. The method of calculating a path which is offset laterally with respect to a reference path according to claim 1, furthermore comprising a step of deleting the said segments the direction of travel of which is reversed.

3. The method of calculating a path which is offset laterally with respect to a reference path according to claim 1, comprising the following steps for defining the whole of the laterally offset path:

calculating the laterally offset flight plan, defining segments associated with the segments belonging to the reference flight plan, analyzing all of the segments of the laterally offset flight plan in such a way as to detect a segment the direction of travel of which is reversed with respect to that of the corresponding segment belonging to the reference flight plan, replacing the associated segments following the associated segments whose direction of travel is reversed by half lines, each of the half lines passing through the end point of a following replaced associated segment and being parallel with the following replaced associated segment, calculating elementary paths making it possible to connect the segments whose direction of travel is not reversed.

4. The method of calculating a path which is offset laterally with respect to a reference path according to claim 3, furthermore comprising a step of deleting segments having a reversed direction of travel by carrying out for each of the segments the collocation of its end point with the end point of the preceding segment whose direction of travel is not reversed.

5. The method of calculating a path which is offset laterally with respect to a reference path according to claim 3, wherein a calculation of a path making it possible to connect the segments situated on either side of deleted segments is carried out with a pre-existing calculation rule, called the 45° interception rule.

6. The method of calculating a path which is offset laterally with respect to a reference path according to claim 1, further comprising the following steps:

calculating the laterally offset flight plan, defining a series of segments associated with the segments belonging to the reference flight plan, searching, among the series of associated segments, for a segment i whose direction of travel is reversed and, for each segment i detected, the repetition of the following steps:

searching for a segment i+j, following the segment i, whose direction of travel is not reversed, analyzing the segment i+j to determine if the elementary path to be calculated must rejoin the start point or the end point of the segment i+j, calculating an elementary path making it possible to connect the segment i—1, whose direction of travel is not reversed, and the segment i+j using an algorithm adapted according to the result of the preceding analysis.

7. The method of calculating a path which is offset laterally with respect to a reference path according to claim 6, furthermore comprising the following step:

the deletion of the segments i to i+j−1 whose directions of travel are reversed.

* * * * *